United States Patent [19]

Cope

[11] Patent Number: 5,847,016
[45] Date of Patent: Dec. 8, 1998

[54] POLYMER AND WOOD FLOUR COMPOSITE EXTRUSION

[75] Inventor: Carroll W. Cope, Marion, Va.

[73] Assignee: Marley Mouldings Inc., Marion, Va.

[21] Appl. No.: 748,201

[22] Filed: Nov. 12, 1996

Related U.S. Application Data

[60] Provisional application No. 60/017,756 May 16, 1996.
[51] Int. Cl.[6] .................................................... C08J 9/00
[52] U.S. Cl. ........................ 521/84.1; 521/145; 521/146
[58] Field of Search ................................ 521/84.1, 145, 521/146

[56] References Cited

U.S. PATENT DOCUMENTS

| | | | |
|---|---|---|---|
| 2,188,396 | 1/1940 | Semon | 18/55 |
| 2,489,373 | 11/1949 | Gilman | 260/37 |
| 2,519,442 | 8/1950 | Delorme et al. | 260/17.4 |
| 2,558,378 | 6/1951 | Petry | 260/41 |
| 2,635,976 | 4/1953 | Meiler et al. | 154/132 |
| 2,680,102 | 6/1954 | Becher | 260/17.3 |
| 2,789,903 | 4/1957 | Lukman et al. | 92/21 |
| 2,926,729 | 3/1960 | Zanini | 160/236 |
| 2,935,763 | 5/1960 | Newman et al. | 18/55 |
| 3,147,518 | 9/1964 | Horgan, Jr. | 57/730.4 X |
| 3,287,480 | 11/1966 | Wechsler et al. | 264/122 |
| 3,308,218 | 3/1967 | Wiegand et al. | 264/121 |
| 3,309,444 | 3/1967 | Schueler | 264/109 |
| 3,349,538 | 10/1967 | Crossman . 3,492,388 .. 1/1970 . Inglin-Knosel | 264/129 |
| 3,493,527 | 2/1970 | Schueler | 260/17.2 |

(List continued on next page.)

FOREIGN PATENT DOCUMENTS

| | | |
|---|---|---|
| 0 586 211 A1 | 3/1994 | European Pat. Off. . |
| 2270311 | 2/1974 | France . |
| 2365019 | 5/1978 | France . |
| 2445885 | 8/1980 | France . |
| 2564374 | 11/1985 | France . |
| 2042176 | 4/1971 | Germany . |
| 2344101 | 1/1977 | Germany . |
| 4307323 A1 | 9/1994 | Germany . |
| 58-179242 | 10/1983 | Japan . |
| 60-082319 | 5/1985 | Japan . |
| 60-163939 | 8/1985 | Japan . |
| 63-139946 | 6/1988 | Japan . |
| 2032805 | 2/1990 | Japan . |
| 1443194 | 7/1976 | United Kingdom . |
| 2036148 A | 6/1980 | United Kingdom . |
| 2104903 | 3/1983 | United Kingdom . |
| 2186655 | 8/1987 | United Kingdom . |
| 2171953 | 9/1989 | United Kingdom . |
| WO/9008020 | 7/1990 | WIPO . |

OTHER PUBLICATIONS

Kokta et al., "Use of Wood Fibers in Thermoplastic Composites", Polymer Composites, Oct. 1983, vol. 4, No. 4, pp. 229–232.

Yam et al., "Composites From Compounding Wood Fibers With Recycled High Density Polyethylene", Polymer Engineering and Science, Mid–Jun. 1990, vol. 30, No. 11, pp. 693–699.

Zadorecki et al., "Future Prospects for Wood Cellulose as Reinforcement in Organic Polymer Composites", Polymer Composites, Apr. 1989, vol. 10, No. 2, pp. 69–77.

Woodhams et al., "Wood Fibers as Reinforcing Fillers for Polyolefins", Polymer Engineering and Science, Oct. 1984, vol. 24, No. 15, pp. 1166–1171.

"Mechanical Properites of Wood", Revision by Bendtsen et al., pp. 4–2 through 4–44.

Maldas et al., "Composites of Polyvinyl Chloride—Wood Fibers: IV. Effect of the Nature of Fibers", Journal of Vinyl Technology, Jun. 1989, vol. 11, No. 2, pp. 90–98.

Raj et al., "Use of Wood Fibers as Filler in Common Thermoplastic Studies on Mechanical Properties", Science and Engineering of Composite Materials, vol. 1, No. 3, 1989, pp. 85–98.

Kokta et al., "Use of Grafted Wood Fibers in Thermoplastic Composites V. Polystyrene", pp. 90–96.

Klason et al., "The Efficiency of Cellulosic Fillers in Common Thermoplastics. Part I. Filling Without Processing Aids or Coupling Agents", International Journal of Polymeric Materials, Mar. 1984, pp. 159–187.

Dalvag et al., "The Efficiency of Cellulosic Fillers in Common Thermoplastics. Part II. Filling with Process Aids and Coupling Agents", International Journal of Polymeric Materials, 1985, vol. 11, pp. 9–38.

Rogalski et al., "Poly(Vinyl–Chloride) Wood Composites", Antec '87, pp. 1436–1441.

Raj et al., "Use of Wood Fibers in Thermoplastics. VII. The Effect of Coupling Agents in Polyethylene–Wood Fiber Composites", Journal of Applied Polymer Science, vol. 37, (1989), pp. 1089–1103.

Kokta et al., "Composites of Polyvinyl Chloride–Wood Fibers. I. Effect of Isocyanate as a Bonding Agent", Polym. Plast. Technol. Eng. 29(1&2), 1990, pp. 87–118.

Kokta et al., "Composites of Polyvinyl Chloride–Wood Fibers. III. Effect of Silane as Coupling Agent", Journal of Vinyl Technology, Sep. 1990, vol. 12, No. 3, pp. 146–153.

Kokta et al., "Composites of Poly(Vinyl Chloride) and Wood Fibers. Part II: Effect of Chemical Treatment", Polymer Composites, Apr. 1990, vol. 11, No. 2, pp. 84–89.

BFGoodrich, Geon Vinyl Division, Section One, FIBERLOC®, Polymer Composites, Engineering Design Data Sheet, pp. 2–15.

"A Complete Guide to Andersen Windows & Patio Doors", 1992 Product Catalog.

European Search Report for Application No. EP 97 30 3324.4 dated Sep. 12, 1997.

*Primary Examiner*—Morton Foelak
*Attorney, Agent, or Firm*—Sidley & Austin; Hugh A. Abrams

[57] ABSTRACT

An extrusion profile is formed of foamed plastic, which includes a filler of wood flour or wood fiber. The foamed plastic may include polyvinyl chloride, chlorinated polyvinyl chloride or polystyrene in combination with the wood flour filler.

7 Claims, 2 Drawing Sheets

U.S. PATENT DOCUMENTS

| | | | |
|---|---|---|---|
| 3,562,373 | 2/1971 | Logrippo | 264/118 |
| 3,645,939 | 2/1972 | Gaylord | 260/17.4 |
| 3,671,615 | 6/1972 | Price | 264/39 |
| 3,844,084 | 10/1974 | Hubbard et al. | 52/730.4 |
| 3,878,143 | 4/1975 | Baumann et al. | 260/17.4 |
| 3,888,810 | 6/1975 | Shinomura | 260/17.4 |
| 3,899,559 | 8/1975 | Johnanson et al. | 264/115 |
| 3,904,726 | 9/1975 | Jacquelin et al. | 264/117 |
| 3,931,384 | 1/1976 | Forquer et al. | 264/120 |
| 3,943,079 | 3/1976 | Hamed | 260/17.4 |
| 3,956,541 | 5/1976 | Pringle | 428/2 |
| 3,956,555 | 5/1976 | McKean | 428/106 |
| 3,969,459 | 7/1976 | Fremont et al. | 264/109 |
| 4,005,162 | 1/1977 | Bucking | 264/25 |
| 4,012,348 | 3/1977 | Chelland et al. | 260/28.5 |
| 4,016,232 | 4/1977 | Pringle | 264/112 |
| 4,018,722 | 4/1977 | Baker | 260/2.3 |
| 4,033,913 | 7/1977 | Sunden | 260/17 |
| 4,045,603 | 8/1977 | Smith | 428/2 |
| 4,056,591 | 11/1977 | Goettler et al. | 264/108 |
| 4,058,580 | 11/1977 | Flanders | 264/113 |
| 4,071,479 | 1/1978 | Broyde et al. | 260/2.3 |
| 4,097,648 | 6/1978 | Pringle | 428/326 |
| 4,102,106 | 7/1978 | Golder et al. | |
| 4,115,497 | 9/1978 | Halmo | 264/115 |
| 4,145,389 | 3/1979 | Smith | 264/40.7 |
| 4,168,251 | 9/1979 | Schinzel et al. | 260/17.4 R |
| 4,181,764 | 1/1980 | Totten | 428/155 |
| 4,187,352 | 2/1980 | Klobbie | 521/79 |
| 4,203,876 | 5/1980 | Dereppe et al. | 260/17.4 |
| 4,228,116 | 10/1980 | Colombo et al. | 264/119 |
| 4,239,679 | 12/1980 | Rolls et al. | 260/42.49 |
| 4,244,903 | 1/1981 | Schnause | 264/68 |
| 4,248,743 | 2/1981 | Goettler | 260/17.4 |
| 4,248,820 | 2/1981 | Haataja | 264/113 |
| 4,250,222 | 2/1981 | Mavel et al. | 428/285 |
| 4,263,184 | 4/1981 | Leo et al. | 260/17.4 |
| 4,273,688 | 6/1981 | Porzel et al. | 260/17.4 |
| 4,277,428 | 7/1981 | Luck et al. | 264/118 |
| 4,281,039 | 7/1981 | Miura et al. | 428/159 |
| 4,290,988 | 9/1981 | Nopper et al. | 264/112 |
| 4,305,901 | 12/1981 | Prince et al. | 264/176 |
| 4,311,554 | 1/1982 | Herr | 162/164 |
| 4,311,621 | 1/1982 | Nishizawa et al. | 260/17.2 |
| 4,328,136 | 5/1982 | Blount | 523/204 |
| 4,376,144 | 3/1983 | Goettler | 428/36 |
| 4,382,108 | 5/1983 | Carroll et al. | 428/326 |
| 4,393,020 | 7/1983 | Li et al. | 264/108 |
| 4,414,267 | 11/1983 | Coran et al. | 428/288 |
| 4,420,351 | 12/1983 | Lussi et al. | 156/62.4 |
| 4,426,470 | 1/1984 | Wessling et al. | 524/35 |
| 4,440,708 | 4/1984 | Haataja et al. | 264/109 |
| 4,454,091 | 6/1984 | Chion et al. | 264/171 |
| 4,455,709 | 6/1984 | Zanini | 16/90 |
| 4,481,701 | 11/1984 | Hewitt | 29/416 |
| 4,491,553 | 1/1985 | Yamada et al. | 264/51 |
| 4,503,115 | 3/1985 | Hemels et al. | 428/281 |
| 4,505,869 | 3/1985 | Nishibori | 264/115 |
| 4,506,037 | 3/1985 | Suzuki et al. | 521/82 |
| 4,508,595 | 4/1985 | Gasland | 162/158 |
| 4,551,294 | 11/1985 | Wottka et al. | 264/175 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 418/15 |
| 4,619,097 | 10/1986 | Trummer et al. | 52/730.3 |
| 4,645,631 | 2/1987 | Hegenstaller et al. | 264/69 |
| 4,659,754 | 4/1987 | Edwards et al. | 523/214 |
| 4,663,225 | 5/1987 | Farley et al. | 428/290 |
| 4,686,251 | 8/1987 | Ostermann et al. | 523/448 |
| 4,687,793 | 8/1987 | Motegi et al. | 523/200 |
| 4,716,062 | 12/1987 | Klein | 428/36 |
| 4,734,236 | 3/1988 | Davis | 264/112 |
| 4,737,532 | 4/1988 | Fujita et al. | 524/13 |
| 4,769,109 | 9/1988 | Tellvik et al. | 162/123 |
| 4,769,274 | 9/1988 | Tellvik et al. | 428/218 |
| 4,774,272 | 9/1988 | Lamphere et al. | 524/13 |
| 4,790,966 | 12/1988 | Sandberg et al. | 264/39 |
| 4,818,604 | 4/1989 | Tock | 428/319.9 |
| 4,820,763 | 4/1989 | Yang | 524/505 |
| 4,851,458 | 7/1989 | Hopperdietzel | 523/205 |
| 4,865,788 | 9/1989 | Davis | 264/112 |
| 4,889,673 | 12/1989 | Takimoto | 264/118 |
| 4,894,192 | 1/1990 | Warych | 264/68 |
| 4,915,764 | 4/1990 | Miani | 156/244.19 |
| 4,927,579 | 5/1990 | Moore | 264/101 |
| 4,929,409 | 5/1990 | Agren et al. | 264/508 |
| 4,935,182 | 6/1990 | Ehner et al. | 264/112 |
| 4,960,548 | 10/1990 | Ikeda et al. | 264/40.4 |
| 4,968,463 | 11/1990 | Levasseur | 264/40.1 |
| 4,973,440 | 11/1990 | Tamura et al. | 264/114 |
| 4,978,489 | 12/1990 | Radvan et al. | 264/118 |
| 4,978,575 | 12/1990 | Ziess | 428/402 |
| 4,988,478 | 1/1991 | Held | 264/518 |
| 5,002,713 | 3/1991 | Palardy et al. | 264/109 |
| 5,008,310 | 4/1991 | Beshay | 524/13 |
| 5,009,586 | 4/1991 | Pallmann | 425/311 |
| 5,021,490 | 6/1991 | Vyvoda et al. | 524/140 |
| 5,049,334 | 9/1991 | Bach | 264/122 |
| 5,057,167 | 10/1991 | Gersbeck | 156/62.2 |
| 5,075,057 | 12/1991 | Hoedl | 264/115 |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,087,400 | 2/1992 | Theuveny | 264/115 |
| 5,088,910 | 2/1992 | Goforth et al. | 424/142 |
| 5,093,058 | 3/1992 | Harmon et al. | 264/115 |
| 5,096,046 | 3/1992 | Goforth et al. | 198/604 |
| 5,406,768 | 4/1995 | Giuseppe et al. | 52/730.4 |
| 5,474,722 | 12/1995 | Woodhams | 264/45.3 |
| 5,508,103 | 4/1996 | Cope | 428/318.8 |

POLYMER AND WOOD FLOUR COMPOSITE EXTRUSION

This application claims the benefit of U.S. Provisional application Ser. No. 60/017,756, filed May 16, 1996.

BACKGROUND OF THE INVENTION

The present invention relates to polymer extrusion and injection molded products and processes. The invention has particular application to a polymer extrusion or injected molded polymer that includes an addition of wood flour as an ingredient to the composite material.

As a result of the increasing cost of wood and the attendant cost of wood frames, there is a demand for alternatives to solid wood construction products. Accordingly, the use of plastic extrusion profiles as substitutes for wood products in the area of picture frames and door, wall and window frames and moldings has increased in recent years. Injection molded plastic has also been utilized in the furniture industry for forming plastic chairs, lounges, tables and the like.

Polymer extrusions are well-known for use in forming components for window and door frames. Plastic extrusion profiles are commonly formed with polymer materials such as polyvinyl chloride and chlorinated polyvinyl chloride (PVC and CPVC), polystyrene, acrylonitrile-butadiene-styrene (ABS) or similar materials. Polymer materials are conventionally used in combination with a variety of fillers, lubricants and pigments. Additionally, for foamed polymers, a blowing agent is also added to the composite. An example of a foamed extrusion is found in commonly assigned U.S. Pat. No. 5,508,103, entitled "Extrusion Product with Decorative Enhancement And Process Of Making The Same."

As a result of the increasing cost of polymer materials, there exists a need for less expensive filler materials, which can be used with polymers such as PVC, but do not adversely affect the strength or wear resistance of the resulting profile. One such filler material that has been given increasing consideration is wood flour or wood fiber. Polyvinyl chloride thermoplastic polymer materials have been combined with wood and wood fiber to make extruded or injection molded materials.

Various patents and publications have proposed extrusion and injection molded materials that combine polymers and wood fibers. One example of such a patent is U.S. Pat. No. 5,406,768, assigned to Andersen Windows. The '768 patent describes a structural component made of polymer and wood fiber in which the polymer is rigid PVC. While rigid PVC has many uses, the present invention is directed primarily to the use of a composite with foam PVC. The extrusion of foamed PVC, includes a blowing or foaming agent. Addition of foaming agents can also affect the ability to add wood flour fillers. However, the use of foamed PVC has advantages over rigid PVC in that the less-dense foamed material allows substantial cost savings in the amount of PVC used in the composite. U.S. Pat. Nos. 5,082,605 and 5,088,910 also describe composite materials formed from polymers and wood or cellulose fibers.

One difficulty presented by additions of wood flour is the absorption of moisture by the wood flour. The loss of moisture within the extrudate can slow the extrusion rate as a result of an increase in viscosity. Another difficulty involves foaming or expansion of the extrudate with the wood flour. The wood flour particles do not expand or foam and, thus, the foaming must be done around the wood flour particles. Also, unlike polymers such as PVC, the addition of heat to wood flour does not improve flowability of the extrudate.

The present invention overcomes these difficulties by a two step process in which the wood flour particles are encapsulated by the resin and pelletized. The pelletized pieces are then mixed with additional resin and blowing agents. It is believed that the encapsulation process prevents moisture absorption and permits foaming of the extrudate. Additionally, the encapsulation provides a smoother skin in the final product.

SUMMARY OF THE INVENTION

In one embodiment, the present invention provides a composite of a polymer and wood flour for formation of an extrusion profile. The profile has use in moldings, window and door frames and similar types of applications. The composite material includes an addition of wood flour mixed with the polymer. The mixture is extruded into a formed profile through an extruder and vacuum tank or shaper.

Prior to extrusion, the wood flour is encapsulated by polymer and then pelletized. After mixing additional polymer with the pelletized product, and the addition of blowing agents, the product is extruded into a final profile. The vacuum tank and shaper help maintain the profile shape as the cellular extrudate expands.

The composite of the present invention can include various types of polymers. Several examples are presented of preferred embodiments in which the polymer comprises PVC, CPVC and polystyrene. The PVC, CPVC and polystyrene are preferably added to the blend in the form of standard, commercially available resins, which include plasticizers to permit flexibility in the final product. The composite also includes an amount of wood flour as well as process aids, stabilizers, lubricants, and colorants and a blowing agent.

The process of the present invention utilizes an extruder in conjunction with a vacuum tank or shaper. The extrusion material is extruded through a die and into the shaper or vacuum tank. The material expands or foams as it enters the shaper and is cooled. The extrusion profile leaves the vacuum tank or shaper in a hardened form, which then fully hardens and cools.

BRIEF DESCRIPTION OF THE DRAWINGS

For a more complete understanding of the present invention, one should refer to the embodiments illustrated in greater detail in the accompanying drawings and described below by way of examples of the invention. In the drawings, which are not to scale.

DESCRIPTION OF THE PRESENTLY PREFERRED EMBODIMENTS

Figure 1:
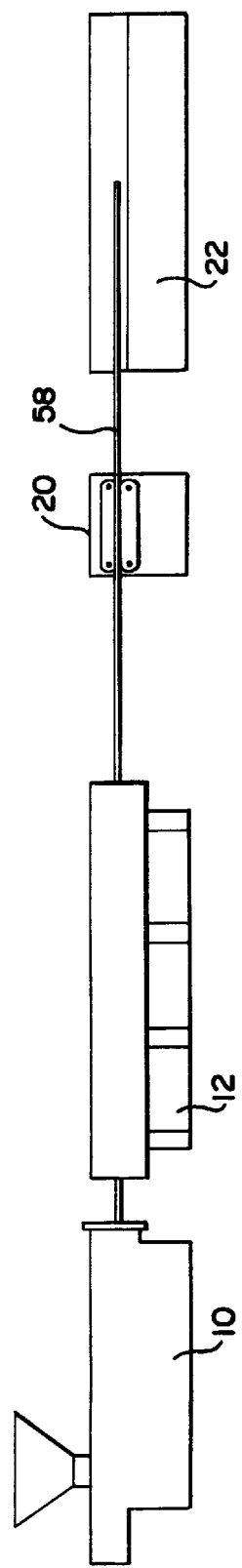
FIG. 1 is a schematic diagram showing the sequence of operations in the final extrusion process of the present invention with polyvinyl chloride and wood flour extrusion material.

The present invention provides a composite of a polymer and wood flour for formation of an extrusion profile. The profile has use in moldings, window and door frames and similar types of applications.

The composite material of the present invention can include various types of polymers in combination with the wood flour filler addition. Several examples are presented of preferred embodiments in which the polymer comprises PVC, CPVC and polystyrene. The PVC, CPVC and polystyrene are preferably added to the blend in the form of standard, commercially available resins, which include plasticizers to permit flexibility in the final product. The composite also includes an amount of wood flour as well as process aids, stabilizers, lubricants, colorants and a blowing agent. The profile material is typically used in a picture frame or door, window, wall or other molding, and thus preferably includes component materials that provide high strength and durability.

The wood flour addition is preferably hardwood in the form of sawdust. The wood flour is ground to a preferred particle size in which 0% to 10% is 425 microns; 35% to 80% is 250 microns; and 15% to 50% is 180 microns. Moisture is preferably controlled in the wood flour to approximately between 3% and 6%.

The materials are formed into an extrudable mixture by combining various ingredients with a high intensity mixer at the appropriate temperature. Resins, fillers and modifiers may be added to the mixture. The extrusion mixture is then formed into a profile by pulling the mixture through an extrusion die and shaper.

Before the addition of wood flour, the polymer resin is blended with additional ingredients in a standard Henschel blender or mixer. In a polystyrene composite of the present invention, crystal polystyrene (CPS) and high impact polystyrene (HIPS) are added to the blender at low speed. Mineral oil, which acts as a wetting agent, is added and blended for approximately 30 seconds followed by the addition of stearic acid, which acts as a lubricant, which is added and blended for approximately another 30 seconds. Titanium dioxide, which acts as a colorant, is optionally added at this time. Full mixing of this mixture with CPS requires approximately 4 minutes total.

Alternatively, PVC and CPVC may be used in which case they are added to the Henschel blender at a temperature of approximately 100° F. and mixed at high speed. The other ingredients are added to the PVC and CPVC blend as explained above for CPS. The PVC and CPVC are mixed to a temperature of approximately 200° F. and then cooled to approximately 150° F.

In the above-described preparation of the resin mixture, the resin is added to the wood flour in a continuous mixing machine and then extruded and pelletized in a pelletizer machine. In this first extrusion to form pellets, blowing agent is not used. Thus, the initial pelletizing extrusion does not include foaming of the polymer blend. The ingredients are preferably added to the mixer hopper by conveyors so that the conveyor rates may be adjusted to add the appropriate amount of each ingredient to the mixture. Thus, the polymer resin compound is added to the continuous mixing machine by one conveyor while the wood flour is added to the continuous mixing machine by another conveyor. Additional conveyors may be used for the additional ingredients, such as lubricants and colorants.

The materials are mixed together in the mixer section of the continuous mixing machine. The fused material has a melt temperature of approximately 350° F. to 450° F. It is understood that sufficient mixing is important to cause encapsulation of the wood flour particles by the polymer resin. The fused material is heated in the continuous mixer machine to the melt temperature where it forms a continuous rope and is then dropped onto the screw extruder section of the continuous mixer machine. Control of the melt temperature of the continuous rope is important to prevent degradation of the extrudant. The melt material then exits the extruder section of the mixer machine through a strand die with approximately 210 openings. The melt proceeds through the strand die and the strands are pelletized by a dry face pelletizer. Again, temperature control through the extruder and strand die is important to prevent degradation of the extrudant. Pellets of material are preferably formed is a size approximately 0.015 inch in length and a diameter of approximately 0.015 inch. Of course pellet size may be increased or decrease by adjustment of the speed of the pelletizing cutter.

The pellets are preferably moved from the cutting area to a cooling chamber by compressed air. The pellets then move through the cooling chamber by chilled compressed air and are discharged into storage vessels. Control of the moisture content of the pellets is also important to assure the quality of the composite. At the end of the pelletizing process, the pellet moisture content should be less than 1% moisture.

As presently understood, the polymer resin (PVC, CPVC or PS) coats the surface of the wood fiber particles. While some resin may penetrate the surface of the fiber, on account of the jagged surface of the fiber particles, the present process is understood to encapsulate or provide a coating about the wood fiber particles with the polymer resin and prevent or minimize the penetration of moisture into the fiber particle.

Only a portion of the total desired amount of resin is used in making the pellets. The remainder of the resin is added when making the final extrusion composite. For example, in a composite having 100 parts total of PVC resin, only 40 parts resin will be added to the mixture to form the pellets. The remaining 60 parts resin will be added in forming the final product. Of course, the PVC is only a portion of the commercially available PVC resin. Similarly, polystyrene is a portion of commercially available polystyrene resin, which is used in the composite of the present invention.

After preparation of the polymer and wood fiber pellets, the pellets are blended into a compound with additional polymer resins for use in making the final extrusion profiles. The polymer/wood fiber pellet is added to a mixer with additional polymer resin. In the case of PS and wood flour, CPS and HIPS are added to a Henshel mixer at low speed along with the addition of the PS/wood flour pellets. At 30 second intervals, additions are made of mineral oil, then blowing agents and nucleating agents and finally the remaining ingredients. The mixture is blended for about 4 minutes at low speed and then dumped into a bin.

In the case of PVC or CPVC and wood flour, the pellets are added to a Henshel mixer at high speed along with PVC or PVC and CPVC resin at a temperature of approximately 100° F. Additional ingredients are added as the temperature is increased. Stabilizer is added at 150° F., followed by filler, process modifiers and process aids at 160° F. and, finally, lubricants and blowing agents at 180° F. When the mixture reaches approximately 200° F., the mixture is dumped into a cooler and allowed to cool to approximately 150° F.

Figure 2:
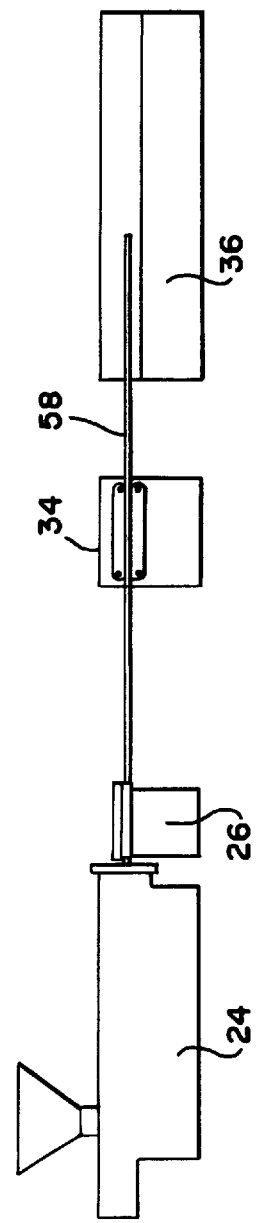
FIG. 2 is a schematic diagram showing the sequence of operations in the final extrusion process of the present invention with polystyrene and wood flour extrusion material.

Schematic diagrams that illustrate two preferred sequences of preparation of the final extrusion profile of the present invention are shown in FIGS. 1 and 2. In FIG. 1, an extruder 10 is used in conjunction with a vacuum tank 12. A puller 20 acts to pull the extruded profile onto a cut-off table 22. The process sequence shown in FIG. 1 is used with the polyvinyl chloride and wood flour extrusion material.

A second sequence of preparation is shown in FIG. 2. In this sequence, the extruder 24 is followed by a shaper 26, puller 34 and cut-off table 36. This process sequence is used with polystyrene and wood flour extrusion material. In each sequence, the extruded profile 58 is pulled through the die and formed.

Figure 3:
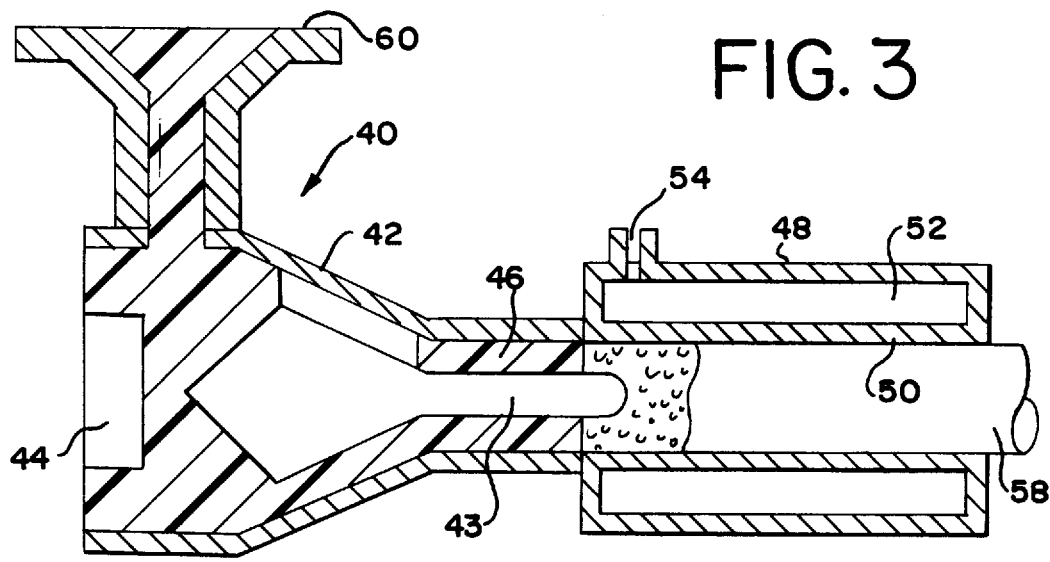
FIG. 3 is a longitudinal sectional view of the end of an extrusion machine with a die and shaper.

As shown in more detail in FIG. 3, extrusion of the above-described mixtures is accomplished by use of an extruder 40 with a body 42, worm 44 and die 46. The worm acts to force the extrusion material through the die and shaper 48. The shaper includes a cylindrical sleeve 50 with a smooth guide wall. The shaper has substantially the same cross-sectional shape as the die. The shaper preferably includes a heat controlling jacket 52 with a connection 54 to enable a temperature regulating fluid, such as water, to be contained within the jacket.

The puller, shown in FIG. 1, acts to draw the extruded profile 58 from the shaper. The composition of extrudable material is prepared and introduced into the extrusion machine through channel 60. The material is pushed through the die, where it only slightly expands, and then begins to fully expand as it enters the shaper 48. The jacket 52 of the shaper 48 is kept at a temperature lower than the softening point of the extrusion material. As the material contacts the inside wall of the shaper, it begins to harden from the outside surface to the inner core.

The material beings to expand or foam as it passes through the die and then it begins to fully expand as it enters the shaper. A vacuum draw on the shaper helps maintain the profile shape as the cellular material expands. The material cools as it passes through the shaper and forms its desired shape. A puller acts to draw the extruded profile from the shaper. The profile achieves a cross-section that is substantially the same as the cross-section of the outlet of the shaper. The temperatures of the die and shaper as well as the speed of the extrusion profile are parameters that affect the properties of the resulting product. A space of several inches may be present between the die exit and the shaper entrance in order to allow some expansion of the extrudate before entering the shaper.

Specifically, for the above-described PS extrusion material, the extruder temperatures are preferably as follows: zone no. 1: 280°–310° F.; zones nos. 2, 3, 4: 290°–350° F.; zone no. 5: 320°–360° F. and the die: 300°–350° F. In contrast, for the above-described PVC and CPVC the extruder temperatures are preferably as follows: zone no. 1: 290°–330° F.; zones nos. 2, 3, 4: 300°–360° F.; zone no. 5: 320°–375° F. and the die: 320°–375° F. The temperatures of zone no. 1 must be sufficiently high to provide strong forward movement of the extrusion material, but not too high so as to cause slippage of the material on the extruder screw. The temperatures of zones nos. 2, 3 and 4 must be regulated to continue proper forward movement of the melt as it becomes a homogeneous mixture to insure a suitable density of the foamed profile. Finally, the temperature of the die is important for the foam to expand to the proper size of the shaper.

Figure 4:
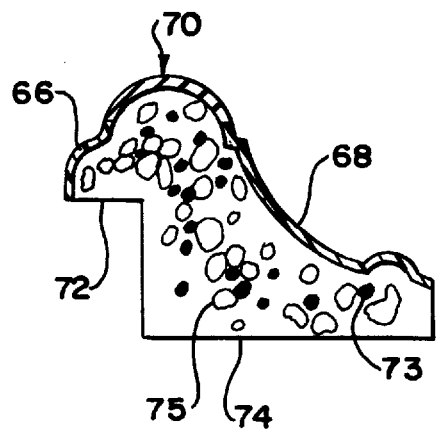
FIG. 4 is a cross-sectional view of the profile that emerges from the shaper of FIG. 3 illustrating, schematically, the wood flour particles.

The cross-section of the extrusion profile of one embodiment of the present invention is shown in FIG. 4. A hard skin 66, 68 may be formed on the outer portion of the profile 70. The remaining portions 72, 74 of the profile may include a hardened skin or may be left without a hard skin, as desired. FIG. 4 also illustrates the encapsulated wood fibers 73 within the cellular matrix 75 of the profile.

Figure 5:
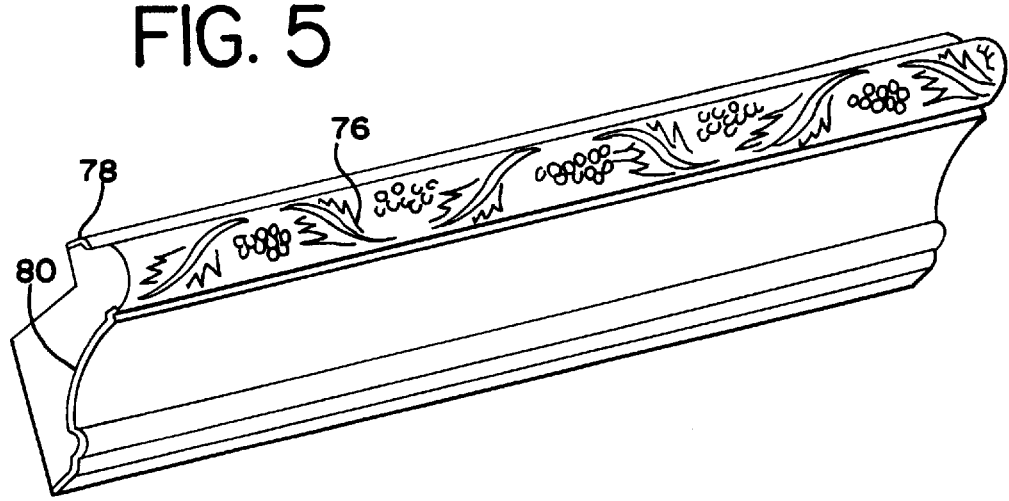
FIG. 5 is a perspective view of a picture frame profile extruded with the composite of the present invention.

One example of a completed profile for a picture frame is shown in FIG. 5. The profile includes a decorative portion 76 as well as hardened skin portions 78, 80. After the profile is cured and hardened, various finishes may be applied to the profile to enhance and highlight the profile. For example, the profile may be painted, stained, glazed, brushed or clear coated. Hot foil stampings may also be applied for further decorative effect.

Using the above-described process, pellets were prepared and extruded into profiles. A PVC/wood flour pellet was prepared using a portion of the total amount of 100 parts PVC resin with the following formulation:

| Ingredient | Parts | Description |
| --- | --- | --- |
| PVC Resin | up to 100 | Resin |
| Mark 1924 | 2 | Tin Stabilizer |
| Kaneka K12 | 7 | Acrylic Process Aid |
| Calcium Carbonate | 4 | Filler |
| Wood Flour | 15 to 60 | Wood Fiber Filler |
| Calcium Sterate | 1 | Lubricant |
| Loxiol 1875 | 1.5 | Ester Lubricant |
| AC-629A | 0.1 | Oxidized Polyethylene Wax Lubricant |

The PVC/wood flour pellets were blended to form an extrudable compound with the remaining PVC resin and blowing agent with the following formulation:

| Ingredient | Parts | Description |
| --- | --- | --- |
| PVC Resin | 100 | Resin |
| Mark 1924 | 2 | Tin Stabilizer |
| Kaneka K12 | 7 | Acrylic Process Aid |
| Calcium Carbonate | 4 | Filler |
| PVC/Wood Flour Pellet | 15 to 60 | Wood Flour Filler |
| Calcium Sterate | 1 | Lubricant |
| Loxiol 1875 | 1.5 | Ester Lubricant |
| AC-629A | 0.1 | Oxidized Polyethylene Wax Lubricant |
| Hughes HRVP 01 | .2 to .7 | Blowing Agent |
| Titanium Dioxide | 0 to 10 | Whitener |

Pellets of a CPVC/wood flour blend were prepared with the following formulation:

| Ingredient | Parts | Description |
| --- | --- | --- |
| PVC Resin | up to 40 | Resin |
| C-PVC Resin | up to 60 | Resin For HDT performance |
| Mark 1924 | 3.5 | Tin Stabilizer |
| Kaneka K12 | 7.45 | Acrylic Process Aid |
| Titanium Dioxide | 10 | Colorant |
| Wood Flour | 15 to 65 | Wood Flour Filler |
| Calcium Sterate | 1.05 | Lubricant |
| VGE-1875 | 1.68 | Ester Wax Lubricant |
| AC-629A | 0.82 | Oxidized Polyethylene Wax Lubricant |

The CPVC/wood flour pellets were blended to form an extrudable composite with the following formulation:

| Ingredient | Parts | Description |
| --- | --- | --- |
| PVC Resin | 40 | Resin |
| C-PVC Resin | 60 | Resin For HDT performance |
| Mark 1924 | 3.5 | Tin Stabilizer |

-continued

| Ingredient | Parts | Description |
|---|---|---|
| Kaneka K12 | 7.45 | Acrylic Process Aid |
| Titanium Dioxide | 10 | Colorant |
| CPVC/Wood Flour Pellet | 15 to 65 | Wood Flour Filler |
| Calcium Sterate | 1.05 | Lubricant |
| VGE-1875 | 1.68 | Ester Wax Lubricant |
| AC-629A | 0.82 | Oxidized Polyethylene Wax Lubricant |
| Hughes HRVP 01 | .2 to .7 | Blowing Agent |
| Titanium Dioxide | 0 to 10 | Whitener |

Pellets of a polystyrene/wood flour blend were prepared with the following formulation:

| Ingredient | Parts | Description |
|---|---|---|
| Crystal Polystyrene | up to 70 | Resin |
| High Impact Polystyrene | up to 30 | Resin For Impact Strength |
| Mineral Oil | .22 | Wetting Agent |
| Stearic Acid | .03 | Lubricant |
| Wood Flour | 60 to 140 | Wood Flour Filler |

The polystyrene/wood flour pellets were blended to form an extrudable composite with the following formulation:

| Ingredient | Parts | Description |
|---|---|---|
| Crystal Polystyrene | 70 | Resin |
| High Impact Polystyrene | 30 | Resin For Impact Strength |
| Mineral Oil | .22 | Wetting Agent |
| Stearic Acid | .03 | Lubricant |
| PS/Wood Flour Pellet | 60 to 140 | Wood Flour Filler |
| Sodium Bicarbonate | .5 to .8 | Blowing Agent |
| Citric Acid | .1 to .2 | Activator |
| Titanium Dioxide | 0 to 10 | Whitener |

The above ingredients in each example were blended and utilized to form an extrusion profile, as described above.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. An extrudable composite of foamable plastic consisting essentially of, in parts (volume):

polymer resin: in an amount of up to 100 wood flour: 15–140 stabilizers: in an amount of up to 5 lubricants: in an amount of up to 5 process aids: in an amount of up to 10 blowing agents: 0.2 to 5 colorant: in an amount of up to 10, said wood flour being in particle form having size comprising, in parts (volume):

| up to 10% | about 425 microns, |
|---|---|
| about 40%–75% | about 250 microns, |
| about 15%–50% | about 180 microns, | said wood flour particles being encapsulated within said polymer resin and formed into pellets prior to being combined with a mixture that includes polymer resin and said blowing agents.

2. The composite of claim 1 wherein said polymer resin is polyvinyl chloride resin.

3. The composite of claim 1 wherein said polymer resin is chlorinated polyvinyl chloride resin.

4. The composite of claim 1 wherein said polymer resin is polystyrene resin.

5. The composite of claim 1 wherein the composition of said composite further comprises, in parts (volume):

polyvinyl chloride resin: about 100 wood flour: 15–60 blowing agents: 0.2 to 5.

6. The composite of claim 1 wherein the composition of said composite further comprises, in parts (volume):

polystyrene resin: about 100 wood flour: 60–140 blowing agents: 0.5 to 5.

7. The composite of claim 1 wherein the composition of said composite further comprises, in parts (volume):

chlorinated polyvinyl chloride resin: about 60 polyvinyl chloride resin: about 40 wood flour: 15–65 blowing agents: 0.2 to 5.

\* \* \* \* \*